United States Patent [19]

Cadars

[11] 4,456,059
[45] Jun. 26, 1984

[54] HEAT EXCHANGER HAVING A BUNDLE OF PARALLEL TUBES, AND METHOD OF ASSEMBLING ITS COMPONENT PARTS

[75] Inventor: Patrick Cadars, Montigny, France
[73] Assignee: Valeo, Paris, France
[21] Appl. No.: 415,029
[22] Filed: Sep. 7, 1982
[30] Foreign Application Priority Data
 Sep. 14, 1981 [FR] France .................. 81 17353
[51] Int. Cl.³ ................................. F28F 9/04
[52] U.S. Cl. ........................... 165/173; 165/69;
 285/137 R; 285/162; 285/192; 285/222
[58] Field of Search ........... 165/173, 175, 178, 69;
 285/137 R, 162, 222, 192, 382.4

[56] References Cited

U.S. PATENT DOCUMENTS

| | | | |
|---|---|---|---|
| 3,922,768 | 12/1975 | Takayasu | 165/173 X |
| 4,224,982 | 9/1980 | Frei | 165/173 X |
| 4,305,459 | 12/1981 | Nonnenmann et al. | 165/173 |

FOREIGN PATENT DOCUMENTS

| | | | |
|---|---|---|---|
| 2448332 | 4/1976 | Fed. Rep. of Germany | 165/173 |
| 865128 | 5/1941 | France | 165/173 |
| 2331738 | 6/1977 | France | |
| 2474674 | 7/1981 | France | |
| 394129 | 6/1933 | United Kingdom | 165/178 |

*Primary Examiner*—Sheldon J. Richter
*Attorney, Agent, or Firm*—Dennison, Meserole, Pollack & Scheiner

[57] ABSTRACT

The heat exchanger (10), e.g. a motor vehicle radiator, has a bundle of thin-walled metal tubes (12) passing through a perforated plate or collector (18) via holes (23) therethrough. The collector plate is made with holes having walls that are highly elastic, either by the collector being molded from a highly elastic plastic, or by the collector plate being made from a sheet of metal with the holes being formed with spring shaped rims. The elasticity is used to grip and seal the tubes (12) in the holes (23) through the collector plate, and the relative strengths of the tubes and the plate are such that the portions (38, 61, 92) of the tubes thus elastically gripped in said holes are contracted by the elastic grip and are flanked on either side by non-contracted portions (42, 41; 66, 74; 93, 94) of tube which ensure that the tubes are held fast against longitudinal movement in either direction relative to the collector plate.

10 Claims, 9 Drawing Figures

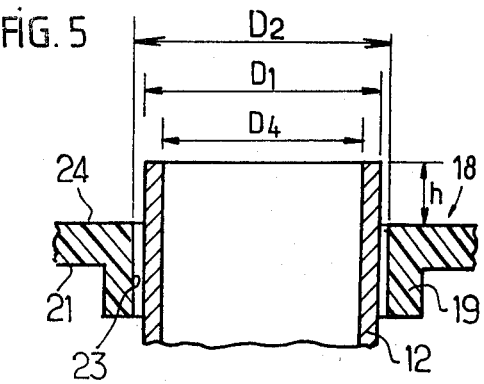
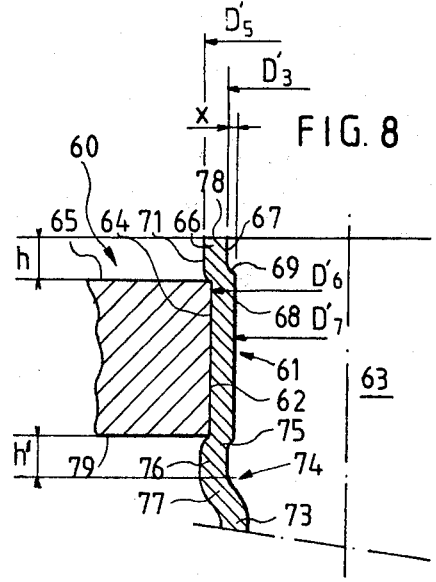
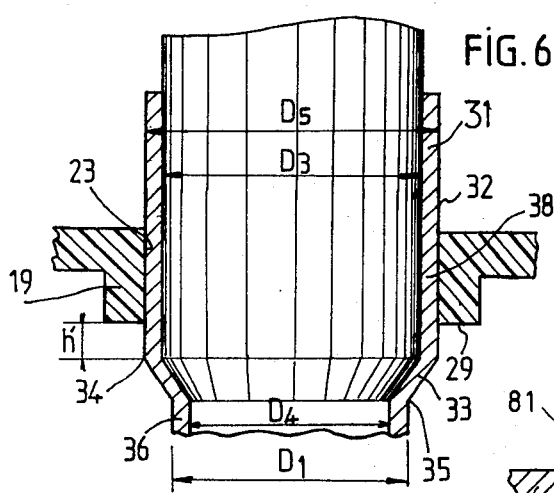

HEAT EXCHANGER HAVING A BUNDLE OF PARALLEL TUBES, AND METHOD OF ASSEMBLING ITS COMPONENT PARTS

The invention relates to heat exchangers comprising a bundle of parallel tubes suitable for being provided with heat exchange members such as fins, the tubes being mounted at at least one of their ends in a perforated plate or collector, which constitutes the base of a liquid inlet and/or outlet tank or water box.

BACKGROUND OF THE INVENTION

Such heat exchangers are particularly applicable to motor vehicles where the liquid is the liquid provided to prevent the internal combustion engine from rising to too high a temperature and/or for conditioning the air admitted to the vehicle cabin.

In car construction, where the equipment lightness is of major importance, heat exchangers are commonly made from thin metal tubes of copper, aluminum or aluminum alloy. To enable the thin metal tubes to be simply assembled on a collector or perforated plate, a metal collector plate is generally used, and for many years the ends of the tubes were assembled thereto by soldering.

In more recent techniques which have now become widespread, each of the holes in the collector plate is surrounded by a rim, a sleeve of rubber or the like is interposed between the rim and the end of the tube, and the sleeve is then compressed by expanding the end of the tube, thus sealing the passage of the tube through the collector plate.

Proposals have also been made to use a collector plate of plastic material, mainly in order to facilitate its sealed assembly to a cover which is usually likewise made of plastic material, and which, together with the collector plate constitutes the water box. However, embodiments using plastic material collector plates have not, up to now, given rise to practical applications because of the difficulties in sealing a plastic material collector plate to the metal tubes passing therethrough.

To mitigate the sealing problems which occur with such an assembly, proposals have been made to use a plastic material for the collector plate with substances embedded therein chosen to ensure that the coefficient of thermal expansion of the collector plate is the same as that of the metal tubes passing through it. However, this technique has not solved the wider problem of manufacture which, particularly for motor vehicles, must be simple, cheap, and capable of providing uniform results.

Preferred embodiments of the present invention satisfy these requirements.

SUMMARY OF THE INVENTION

The present invention provides a heat exchanger having a bundle of thin metal tubes passing through a perforated plate or collector via holes therethrough, wherein said collector plate is made with holes having walls that are highly elastic, with said elasticity being used to grip and seal the tubes in the holes through the collector plate, and wherein the portions of the tubes thus elastically gripped in said holes are contracted by the elastic grip and are flanked on either side by non-contracted portions of tube which ensure that the tubes are held fast against longitudinal movement in either direction relative to the collector plate.

The collector plate may either be made of a plastic material that is highly elastic on setting, or else it may be made of sheet metal in which rims are formed around the holes in a shape suitable for imparting the desired degree of elasticity to the walls of the holes. The plastic collector may also be fitted with rims round its holes, but their shape is not critical.

The invention also provides a method of assembling such a heat exchanger, wherein the ends of the tubes are inserted in the holes through the collector plate and are arranged to project therefrom, and wherein a punch is then thrust into the projecting end of each tube lodged in a hole through the collector plate.

In other words, each tube-receiving hole through the collector plate is deformed by that portion of the tube which passes through said collector plate being expanded or dilated by inserting the punch. The punch is of such a size that, while not spoiling the metal of the tube, it presses the tube against the wall of the hole and elastically deforms the adjacent portion of the collector plate or the rim around the hole which, after the punch has been removed remains pressed against the tube, thereby making a sealed connection between the tube and the collector plate.

The portion of the tube which is in contact with the collector plate is radially contracted under the effect of the elastic forces developped by the collector plate, and the tube projects far enough from the outside face of the collector plate for the projecting portion which is not contracted and which is therefore of greater cross section than the contracted portion to effectively oppose any displacement of the tube towards the central portion of the heat exchanger.

In a preferred implementation, the punch is inserted far enough to expand the portion of the tube which extends inwardly beyond the inside face of the collector plate. This expansion, in conjunction with the contraction of the tube where it passes through the hole (after the punch is removed), effectively oppose outward displacement of the tube, the tube thereby being positively held fast relative to displacement in either direction relative to the collector plate.

The invention is equally applicable to cases where the tubes pass through the collector plate via plain holes or via holes edged with rims which surround the tubes.

There are no absolutely essential requirements to be met in a heat exchanger in accordance with the invention concerning coefficients of thermal expansion, neither for the plastic material of the collector plate nor for the metal of the tubes, the elasticity of the collector plate material permanently ensuring the application of pressure by the wall of the holes through the collector plate on the surface of the tubes.

BRIEF DESCRIPTION OF THE DRAWINGS

In the following description, given by way of example, reference is made to the accompanying drawings, in which:

FIG. 5 is a similar view of FIG. 2, but shows a portion thereof on a larger scale;

FIG. 6 is a similar view to FIG. 3, but shows a portion thereof on a larger scale;

FIG. 7 is a diagrammatic view similar to FIG. 4, but shows a portion thereof on a larger scale;

FIG. 8 is a section similar to FIG. 7, but for a different embodiment; and

FIG. 9 is a section through a variant.

MORE DETAILED DESCRIPTION

Figure 1:
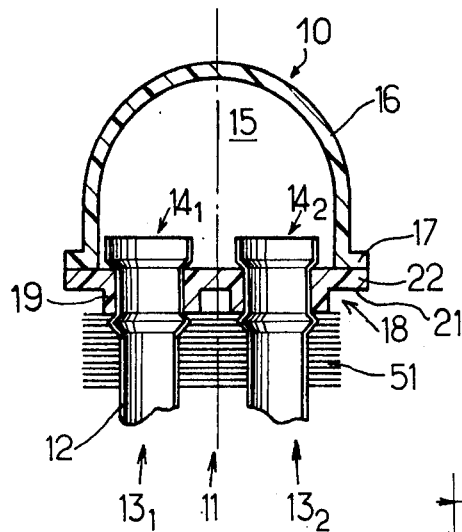
FIG. 1 is a vertical section through a portion of a heat exchanger in accordance with the invention.

The heat exchanger 10 comprises a bundle 11 (FIG. 1) of thin metal tubes 12 disposed in the embodiment shown in two rows $13_1$ and $13_2$. The ends $14_1$ and $14_2$ of the tubes in the two rows open out into the chamber 15 of a water box delimited by a cover 16 and by a perforated plate or collector 18. The cover is made of plastic material and has a peripheral flange 17. The tubes 12 pass through the collector plate 18 near to their ends 14. The collector plate is made of plastic material and, in the embodiment shown, it has cylindrical rims 19 projecting from the inside face 21 of the collector plate for the tubes 12 to pass through. The edge 22 of the collector plate is used when assembling it to the flange 17 of the cover 16, the edge being advantageously ultra-sonically welded to the flange.

In accordance with the invention the plastic material or synthetic resin of which the collector plate 18 is made is highly deformable elastically.

Plastic materials in current use which meet this condition include, for example, polyamides, modified polyoxyphenylene, polyacetal, polypropylene, etc.

Figure 2:
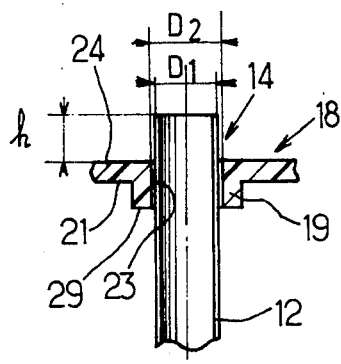
FIG. 2 is a section showing one step in the assembly of a tube in a collector plate.

Substances are advantageously embedded in the plastic material to reinforce it.

Where the tubes 12 are of circular cross section, the holes 23 (FIGS. 2 and 5) edged by the rims 19 are cylindrical of circular cross section, and in principle, they are free from projections or grooves so that the collector plate as a whole is easy to mould as a single piece.

The tubes 12 may be tubes of the type generally used for the construction of heat exchangers for motor vehicles, being made, for example, of aluminum, of aluminum alloy or of copper, with a wall thickness of about 0.4 mm.

In one embodiment, the diameter $D_2$ of the hole 23 is slightly larger than the outside diameter $D_1$ of the tube, so that there is no difficulty in threading the ends 14 of the tubes 12 in the rims 19.

In a variant, the diameter $D_2$ of the holes 23 is substantially equal to the outside diameter $D_1$ of the tube, and the tubes are inserted as a push fit.

In either case, the tubes 12 are inserted through the collector plate 18 until their ends 14 project beyond the top face 24 of the collector plate 18 by a distance h where:

$$h \geq D_2/10$$

Punches 25 (FIG. 3) having cylindrical bodies 26 and ends 27 chamfered with a truncated cone, for example, are forced into the ends 14 of the tubes 12. The body 26 of each punch has a diameter $D_3$ which is slightly larger than the diameter $D_4$ of the inside cylindrical surface of the ends 14 of the tubes 12.

While the punches 25 are being inserted, the tubes 12 thus expand radially in a regular and smooth manner and they transmit radial forces to the inside surfaces 23 of the collector plate rims 19 thereby increasing the diameter of the holes, with the material from which the rims are made being subjected to elastic deformation with the material which constitutes the portions of the collector plate adjacent to the rims. The radial expansion is performed without spoiling the metal of the tubes and without damaging the tubes.

The punches 25 are inserted until the join lines 28 between the bodies 26 of the punches and the chamfered portions 27 have gone beyond the bottom edges 29 of the collector plate rims 19 by a distance h′ where:

$$h' \geq D_2/10$$

Figure 3:
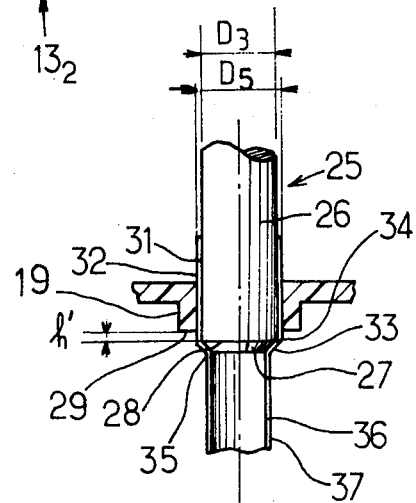
FIG. 3 is a similar view of FIG. 2, showing a later step.

The position reached is that shown in FIG. 3. In this position, each tube 12 has a cylindrical portion 31 with an outside surface 32 of diameter $D_5$, and a tapering portion 33 going from the end 34 of the cylindrical portion 31 to the end 35 of the non-deformed portion 36 of the tube, whose outside surface still has diameter $D_1$ (FIG. 6).

The punches 25 are then removed.

Figure 4:
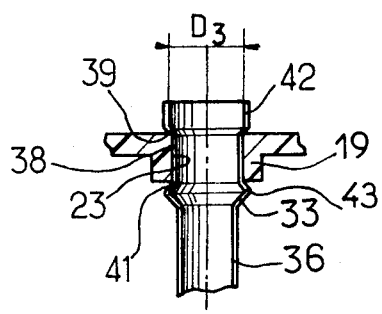
FIG. 4 is similar to FIGS. 2 and 3, but shows the last step.

Once the body 26 of a punch has completely evacuated the hole 23 through a rim 19 in its return movement, the elasticity of the material from which said rim is made tends to make the rim return to its initial configuration. The force exerted by the inside surface 23 against the portion 38 (see FIG. 4) of the outside surface of the tube 12 opposite the rim 19 contracts the portion 38 so that while remaining cylindrical, the portion 38 takes up an outside diameter $D_6$ (FIG. 7) which is smaller than the outside diameter of the adjacent portions of tube that are not contracted by the rim 19.

After the punch has been withdrawn, the portion 38 is thus flanked by two tapering portions 39 and 41 joining it respectively to an outside cylindrical portion 42 of diameter $D_5$ and to the tapering portion 33 which is connected to the non-deformed cylindrical portion 36 of the body of the tube 12. The inside surface 40 of the contracted portion of diameter $D_7$ is subjected to deformation similar to the deformation of the outside surface of the portion 38.

The contraction x of the tube resulting from the stress, ie. the difference between the diameters $D_3$ and $D_7$ is, in principle, greater than 1% of the diameter $D_2$ of the hole 23.

The diameter $D_8$ of the connection line 43 between the portions 41 and 33 is not much different from the diameter $D_5$ of the outside surface 32 of the cylindrical portion 31.

The ends 14 of the tubes 12 are thus assembled in a sealed manner to the collector plate 18 without inserting a sealing ring of rubber or the like and without requiring ribs or raised edges in the tube-receiving holes through the collector plate.

The contraction force applied to the tube by the elasticity of the rim 19 leads to the connection portions 39 and 41 being subjected to bending without the tube material in the portion 38 opposite to said rim being crushed.

In the performance of the invention, the inside surface of the end of the tube is subjected to deformation similar to that of the outside surface.

Reference is now made to FIG. 8 which shows the end of a tube on a large scale after assembly to a perforated plate or collector without rims. The inside surface 62 of a hole 63 through the collector plate 60 is in pressure contact with the outside surface 64 of the portion 61 of the tube which is inside the hole. This portion is flanked beyond the outside face 65 of the collector plate 60 by a rim 66 whose inside cylindrical surface 67 has the diameter $D'_3$ of the punch that performed the assembly and is connected to the inside surface 68 of the portion 61 by a taper 69. The outside surface 71 of the rim 66 has a diameter $D'_5$ which is greater than the diameter $D'_6$ of the hole 63 after expansion.

The portion 61 of the tube gripped by the collector 60 is connected to the non-deformed portion 73 of the tube by a portion 74 having a curved longitudinal section which, starting from the portion 61, has a portion 75 of increasing diameter followed by a middle portion 76 of substantially constant diameter, and then a portion 77 of decreasing diameter.

In this embodiment, the deformation of the outside surface of the tube is likewise similar to the deformation of the inside surface through all sections.

This deformation is noted as x in FIG. 8.

The following conditions need to be met:

$$x \geq D'_7/100$$

or else $$(D'_3 - D'_7)/D'_3 \geq 1/100$$

$$h \geq D'_7/10$$

$$h' \geq D'_7/10$$

where:

$D'_7$ is the diameter of the inside surface 68 of the inside cylindrical portion 61 of the hole 63;

$D'_3$ is the diameter of the inside surface 67 of the rim 66;

h is the distance between the outside surface 65 of the collector plate 60 and the edge 78 of the rim 66; and h' is the distance between the inside surface 79 of the collector 60 and the peak or mid portion 76 of the connection portion 74.

It is clear that in all cases the tubes could have been fitted in known manner with fins 51 before assembly with the collector plate(s), as shown in FIG. 1. The presence of such fins is no hindrance in the making of the tapering portions 41 and 33.

Where desired, the plastic material of which the collector plate is made could also be chosen to have a smaller coefficient of thermal expansion than the metal making up the tubes, so that an increase in temperature, as occurs when hot water is flowing through the heat exchanger, serves to improve sealing.

The invention can also be applied to oval shaped tubes. One way of doing so is to make the ends of the tubes circular before assembly and to assemble as described above.

Another way of doing so is to use oval holes in the collector plate and oval punches.

FIG. 9 shows a variant assembled in accordance with the invention, in which a metal perforated plate 81 has flexible rims 82. Each rim is made by two circular folds 83 and 84 starting from the body 85 of the collector plate, and obtained by initially erecting an outwardly directed ring 86 and then in folding it down to form an inwardly directed ring 87.

The inside surface 88 of the ring 87 applies pressure and hence provides sealing to the outside surface 89 of a tube 91. This is done by a method in accordance with the invention.

The portion 92 of the tube which is opposite the ring 87 is contracted by virtue of the stress to which it is subjected by said ring. The elasticity of the rim 82 provides said stress, and the collector plate is shaped to provide the required degree of elasticity.

The portion 92 of the tube has the end of the tube 93 to one side and the non-deformed portion 94 of the tube to the other, said portions serving to anchor the tube, ie. to make it fast, against moving in one direction or the other.

I claim:

1. A heat exchanger comprising:
   a collector plate having a plurality of through-perforations, the walls of the through-perforations comprising a highly elastic material; and,
   a plurality of thin metal tubes, one end of said tubes passing entirely through and beyond said plate via the perforations with said elastic material gripping and sealing the tubes within the through-perforations, wherein
   the elastic material of the walls of the perforations causes a decrease in the inner and outer diameters of the tube portion elastically gripped, the portion of decreased diameters being flanked on either side by a portion having non-decreased diameters which holds the tubes fast against longitudinal movement in either direction relative to the collector plate.

2. A heat exchanger according to claim 1, wherein the portions of the tubes passing through the perforations are contracted by more than 1% of the perforation diameter.

3. A heat exchanger according to claim 1, wherein the collector plate is made of a plastic material exhibiting a high degree of elasticity when set.

4. A heat exchanger according to claim 3, wherein the collector plate is made of synthetic resin with reinforcing material embedded therein.

5. A heat exchanger according to claim 4, wherein the resin is chosen from the group consisting of polyamides, modified polyoxyphenylene, polyacetal, and polypropylene.

6. A heat exchanger according to preceding claim 3, wherein the perforations are surrounded by rims projecting from the collector plate to form collars around the tubes.

7. A heat exchanger according to claim 1, wherein the collector plate is made of metal sheet, and wherein the perforations the collector plate are surrounded by rims projecting from the collector plate and being shaped in such a manner as to provide the required degree of elasticity for gripping the tubes.

8. A heat exchanger according to claim 1, wherein the distance by which the tubes extend beyond the outside face of the collector plate is more than one tenth of the diameter of the perforations.

9. A heat exchanger according to claim 1, wherein the length of the non-contracted portions of the tubes adjacent to the inside face of the collector plate is more than one tenth of the diameter of the perforations.

10. A heat exchanger according to claim 1, wherein the end of said tubes adjacent to and on both sides of the collector plate is of increased diameters relative to the remainder of the tubes, and wherein the elastically gripped portion of decreased diameters is flanked on either side by a portion of increased diameters.

* * * * *